United States Patent [19]

Knight

[11] E Re. 30,013

[45] Reissued May 29, 1979

[54] MOVING TARGET TROLLEY, MOVING TARGET AND TARGET RANGE

[75] Inventor: Lindsay C. Knight, Albury, Australia

[73] Assignee: Australasian Training Aids Pty. Ltd., Albury, Australia

[21] Appl. No.: 764,010

[22] Filed: Jan. 31, 1977

Related U.S. Patent Documents

Reissue of:

[64] Patent No.: 3,865,373
Issued: Feb. 11, 1975
Appl. No.: 325,560
Filed: Jan. 22, 1973

[30] Foreign Application Priority Data

Jan. 25, 1972 [AU] Australia ..... 7751/72
Mar. 22, 1972 [AU] Australia ..... 8365/72

[51] Int. Cl.[2] ..... F41J 9/00

[52] U.S. Cl. ..... 273/105.2; 273/105.6; 104/119; 104/147 A

[58] Field of Search ..... 273/105.6, 105.2; 104/119

[56] References Cited

U.S. PATENT DOCUMENTS

| | | | |
|---|---|---|---|
| 538,024 | 4/1895 | Lewis | 188/173 |
| 645,229 | 3/1900 | Moller | 273/105.2 |
| 919,378 | 4/1909 | Pinkston | 273/105.2 |
| 1,061,577 | 5/1913 | Whitney | 273/105.2 |
| 2,793,038 | 3/1957 | Wallace et al. | 273/105.2 |
| 3,034,788 | 5/1962 | Cauble | 273/105.6 |
| 3,124,219 | 3/1964 | Lee | 188/173 |
| 3,128,096 | 4/1964 | Hammond et al. | 273/105.6 |
| 3,218,461 | 11/1965 | Saunders et al. | 273/105.6 |
| 3,297,326 | 1/1967 | Corwin | 273/105.6 |
| 3,323,800 | 6/1967 | Knight | 273/105.6 |
| 3,324,832 | 6/1967 | McCain | 273/105.2 |
| 3,391,936 | 7/1968 | Grimes | 273/105.2 |
| 3,559,994 | 2/1971 | Larsen | 273/105.6 |
| 3,570,177 | 3/1971 | Tomaro | 46/216 |
| 3,573,867 | 4/1971 | Mehrens | 273/105.2 |
| 3,586,331 | 6/1971 | Tickell | 273/105.2 |
| 3,874,670 | 4/1975 | Weihl | 273/105.6 |

FOREIGN PATENT DOCUMENTS

| | | | |
|---|---|---|---|
| 533594 | 11/1956 | Canada | 104/119 |
| 712493 | 6/1965 | Canada | 273/105.6 |
| 1113884 | 5/1959 | Fed. Rep. of Germany | 273/105.6 |
| 1056916 | 9/1961 | Fed. Rep. of Germany | 273/105.6 |
| 20212 of | 1910 | United Kingdom | 273/105.2 |
| 1118015 | 6/1968 | United Kingdom | 273/105.6 |

*Primary Examiner*—Richard C. Pinkham
*Assistant Examiner*—Lawrence E. Anderson
*Attorney, Agent, or Firm*—Donald D. Jeffery

[57] ABSTRACT

There is disclosed a target range and mechanisms for use on those target ranges.

The mechanisms comprise a trolley for use in shooting ranges wherein the trolley is constructed and arranged to be movable backwards and forwards along a track and including a target moving mechanism adapted, in use, to carry a target and to move the target from an operative shooting position to an inoperative shooting position and wherein the target moving mechanism is adapted to move the target such that in use, the width of the trolley and target across the direction of intended movement of the trolley when the target is in the inoperative shooting position is not substantially greater than the width of the trolley and target across the direction of intended movement of the trolley when the target is in the operative shooting position.

Preferably the trolley has a target moving mechanism such that in use, the plane of the target extends parallel with the direction of intended movement of the trolley in both the operative and inoperative shooting positions.

Preferably the trolley also has a target moving mechanism which is such as, in use, to move the target from the operative to inoperative shooting positions with the plane of the target swinging in a generally vertical plane extending in the direction of intended movement of the trolley.

Alternatively the trolley has a target moving mechanism which is such that, in use, the plane of the target extends transverse to the direction of intended movement of the trolley in both the operative and inoperative shooting positions.

The range has a trolley and a track along which the trolley is to move, said track being of a width only sufficiently wide to allow the trolley to pass and being of a depth which when the trolley is in the track the top of the trolley will be below the depth of the track the path further being such that, in use, the trolley and the target, when in the inoperative position, are out of sight of a shooter at a firing position and wherein the path over substantially its whole extent is also out of sight of the shooter at the firing position.

30 Claims, 16 Drawing Figures

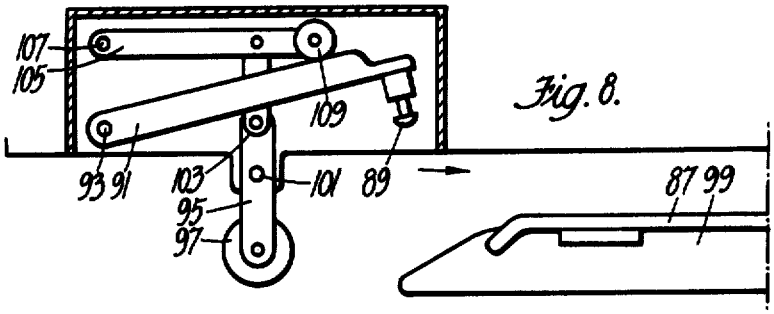
Fig. 8.
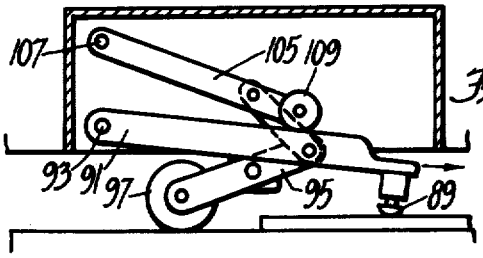
Fig. 9.
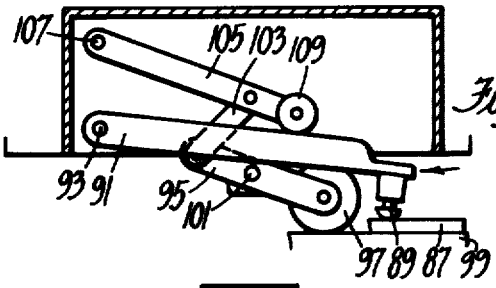
Fig. 10.
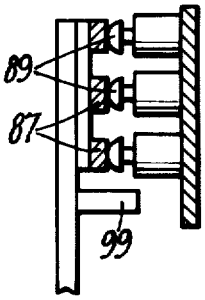
Fig. 11.
Fig. 12.
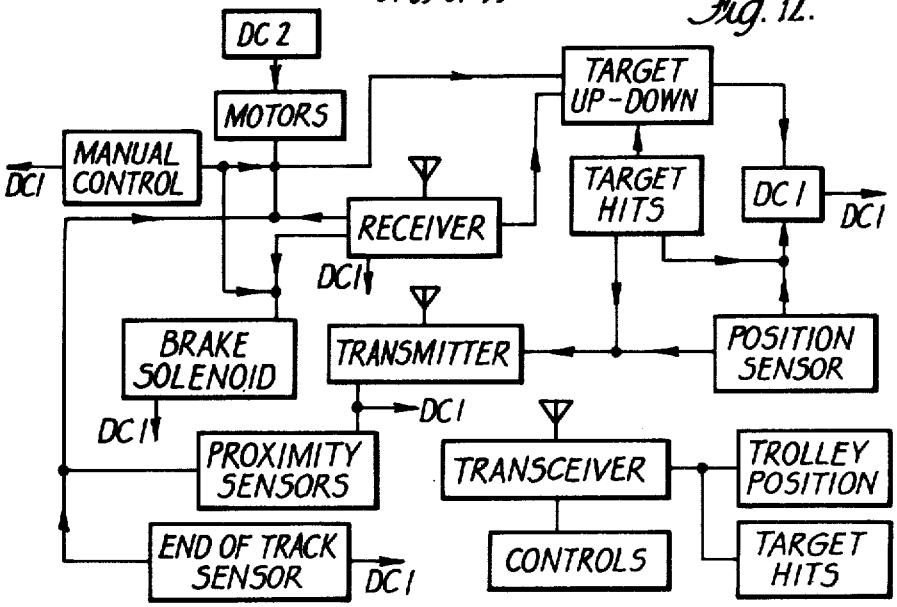

MOVING TARGET TROLLEY, MOVING TARGET AND TARGET RANGE

Matter enclosed in heavy brackets [ ] appears in the original patent but forms no part of this reissue specification; matter printed in italics indicates the additions made by reissue.

BRIEF DESCRIPTION OF THE INVENTION

This invention relates to equipment for target ranges and to target ranges including such equipment.

Broadly the equipment comprises a trolley, which preferably is radio controlled, for moving along a track on a target range and the trolley has a controllable target mechanism which is preferably a radio controlled target mechanism. The controllable target mechanism is of the type which moves a target from an inoperative shooting position to an operative shooting position.

The inoperative shooting position and operative shooting position are defined respectively as wherein a target carried by the target mechanism is at least not substantially visible to a shooter and wherein a target carried by the target mechanism is visible to a shooter. Most preferably the target mechanism has a hit call facility and a radio hit count facility.

The width of the trolley and target mechanism and target are constructed and arranged to be substantially identical in the operative and inoperative shooting positions.

Broadly the range comprises a track along which the above trolley with the controllable target mechanism is to move and wherein the track and trolley and controllable target mechanism are in use out of sight of a shooter at a firing area on the range by being in a track of width only sufficiently wide to allow the trolley to move and wherein targets are made to move from the inoperative shooting position to the operative shooting position by being signalled by the controllable means.

Therefore according to the invention there is provided a self propelling trolley for use in shooting ranges wherein the trolley is constructed and arranged to be movable backwards and forwards along a track and including a target moving mechanism adapted, in use, to carry a target and to move the target from an operative shooting position to an inoperative shooting position and wherein the target moving mechanism is adapted to move the target such that in use the width of the trolley and target across the direction of intended movement of the trolley when the target is in the inoperative shooting position is not substantially greater than the width of the trolley and target across the direction of intended movement of the trolley when the target is in the operative shooting position.

According to a further aspect of the invention there is provided a shooting range including a trolley as defined above, a track along which the trolley is to move, said track being of a width only sufficiently wide to allow the trolley to pass and being of depth which when the trolley is in the track the top of the trolley will be below the depth of the track the path further being such that in use, the trolley and the target, when in the inoperative position, are out of sight of a shooter at a firing position and wherein the path over substantially its whole extent is also out of sight of the shooter at the firing position.

DESCRIPTION OF PRIOR ART

Trolleys which carry target mechanisms for moving targets from an inoperative shooting position to an operative are known. Such systems have, however, a very real disadvantage and this is particularly so when the trolleys are used on an open range wherein the targets, apart from being fired at by weapons such as rifles, mortars and pistols, are fired at with large calibre projectiles such as those fired by tanks. The disadvantage is that in such ranges it is very difficult to camouflage the track. Obviously it is a requirement that the track over its whole extent be camouflaged so that a trolley carrying a target in the inoperative position can "sneak up" or move close to the shooter and the target moved to the operative shooting position thereby simulating a surprise attack, without the shooter being able to anticipate where a target is likely to appear. All systems known to date suffer from that disadvantage as in all known systems the targets have moved from the operative position to the inoperative position by swinging across the direction of intended movement of the trolley. Thus for a target which stands 5 feet high—i.e., a target representing a solider—the width of the trolley, target mechanism and target in the inoperative position is greater than 5 feet. This in turn means that the width of the track along which the trolley moves must be at least equal to that width. In an open range such track is easily visible even if considerable undergrowth surrounds the track.

With the present invention because the width of the track is only sufficiently wide to allow the trolley to pass, the track can be easily camouflaged by undergrowth such as grass growing on both sides of the track or alternatively the trolley can move in a trench which is of the fractionally larger width than the track sufficient only to allow the trolley to move therein.

Most importantly the cost of installing a range, according to the present invention, is less than for known ranges as the amount of earth required to be removed to provide the trench is far less and moreover the cost of removing that earth from the range is less than would be the cost of removing the earth required for a trench required where the targets swing on the trolley across the direction of intended movement of the trolley as the width of the trench is much less but the depth thereof is about the same.

Further with the trolleys according to the present invention a range can be quickly set up by simply using a back hoe on a tractor to dig the trench. This is in itself far less expensive than using other machinery for digging the wider trenches for the known ranges.

Thus constructions of trolleys and target mechanisms specifically excluded from the invention are those which move targets from the inoperative to operative positions by swinging or otherwise moving the target across the direction of intended travel of the trolley.

One way in which the targets are moved from the inoperative to operative positions and included in the invention is by swinging the target in the plane of the target in the direction of intended movement of the trolley. This is particularly provided for when the trolley and plane of the target move generally perpendicular to the direction of firing.

Another way in which the targets are moved and included in the invention is by swinging the targets, with the plane of the target extending across the direction of intended movement of the trolley, in the direction of intended movement of the trolley. This is particularly provided for when the trolley and target are moving in a direction generally in line with the direction of firing and wherein the target faces the shooter and moves from the inoperative to operative positions by swinging or otherwise moves forwardly or rearwardly.

OBJECTS OF THE INVENTION

It is one object of the invention to provide a trolley and target mechanism which in the inoperative and operative target positions have substantially the same width as the width of the trolley and mechanism thereby permitting a range to be established wherein the track is only marginally larger in width than the width of the trolley and wherein a less visible track to the shooter is presented than hitherto known. It is a further object of the invention to provide a target range which includes a trolley and target mechanism wherein the width thereof including a target carried by the trolley and mechanism has a width in the inoperative position which is substantially the same as in the operative position and is substantially equal to the width of the trolley and mechanism, and the width of the track therefore is marginally larger than that width.

DESCRIPTION OF THE DRAWINGS OF PREFERRED EMBODIMENTS

Figure 5:
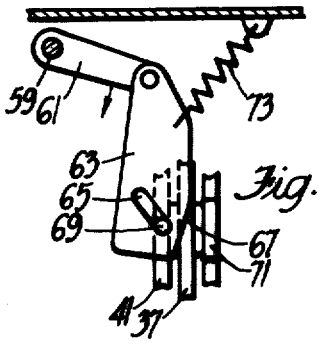
FIG. 5 is a part cross section view taken along line 5—5 of FIG. 3 at one particular instant of operation.
Figure 6:
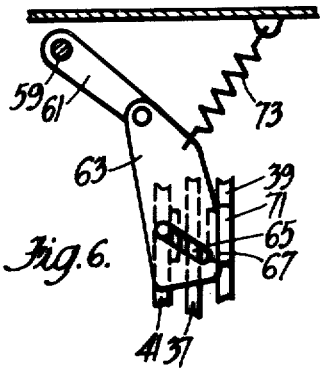
Figure 7:
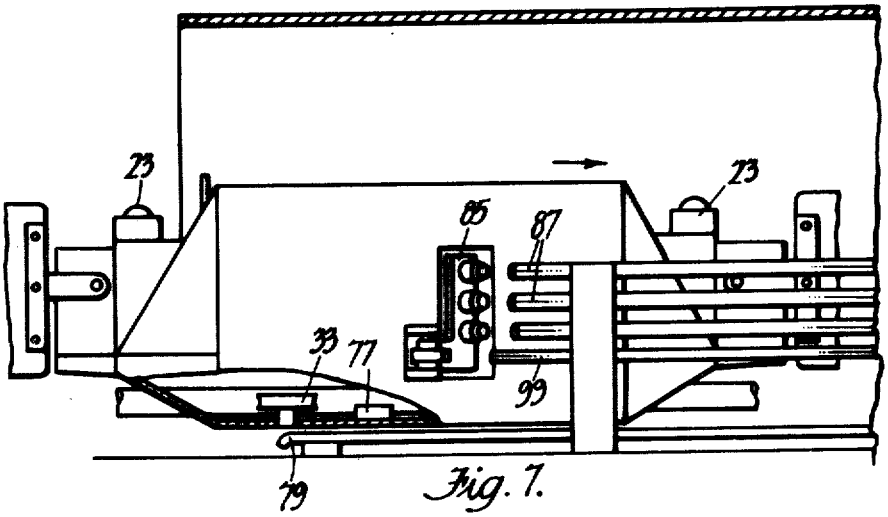
Figure 13:
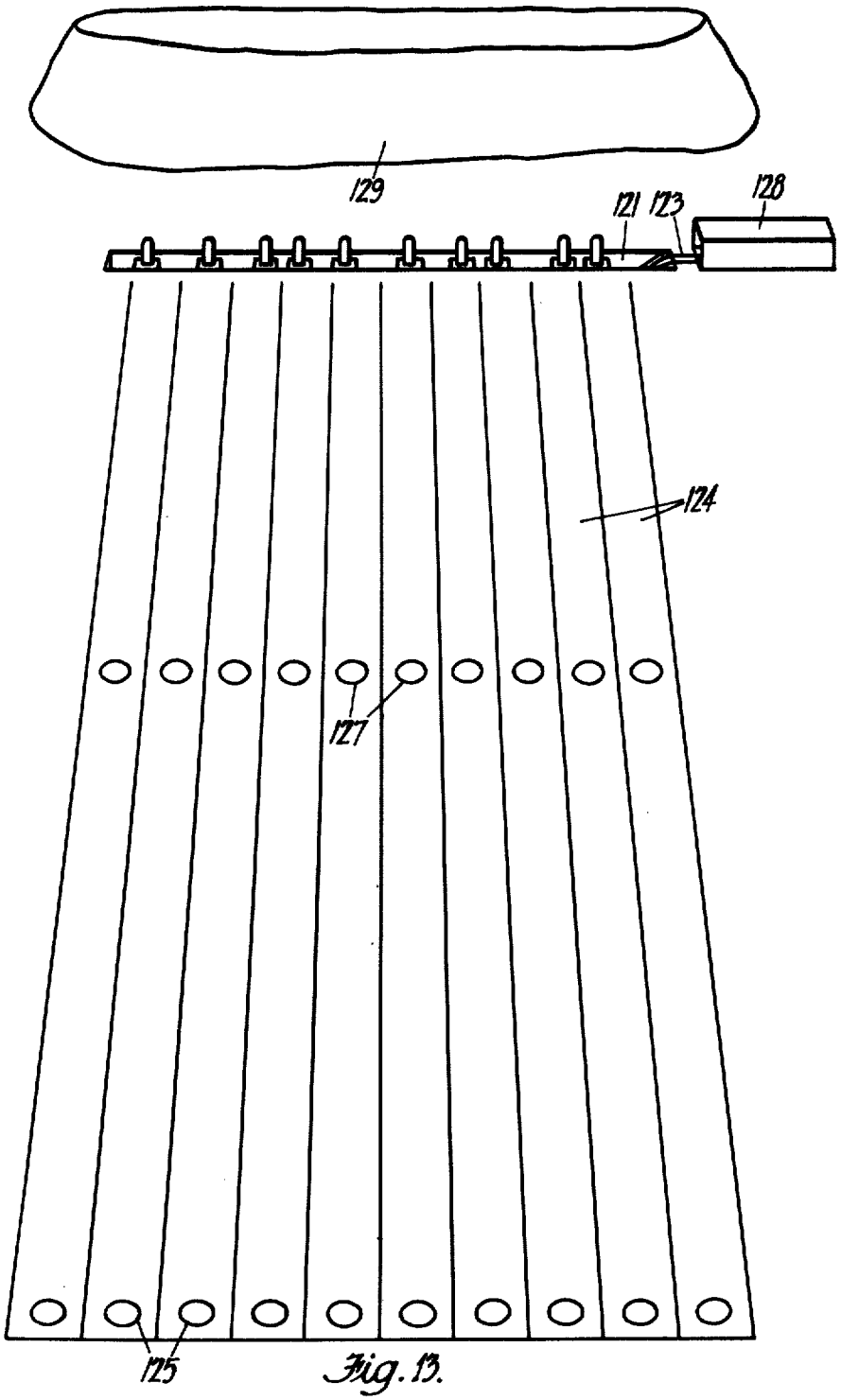
Figure 14:
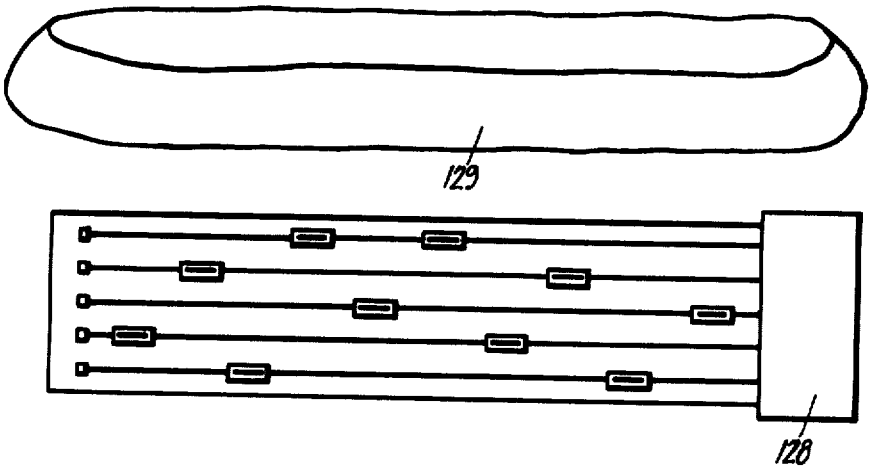
Figure 14:
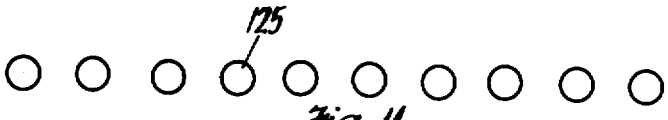
Figure 15:
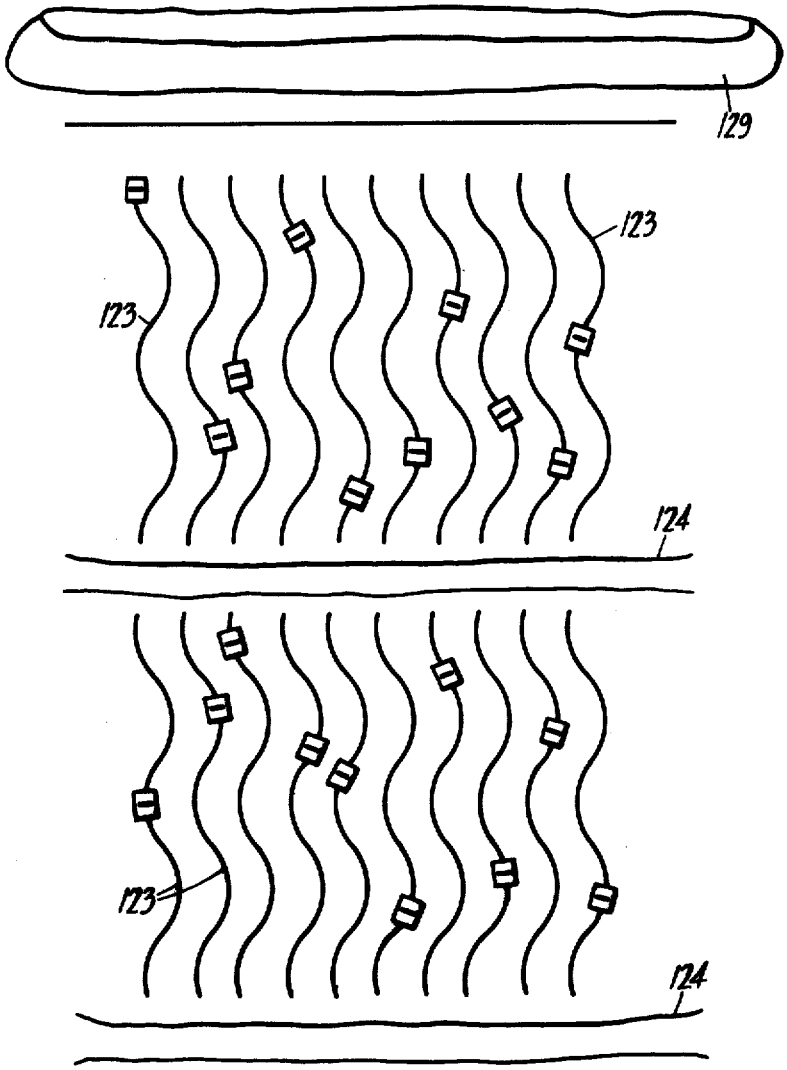
Figure 15:
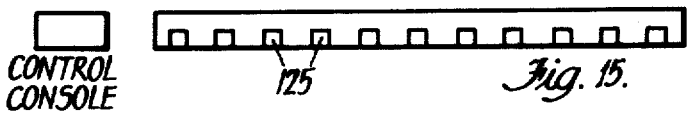
Figure 16:
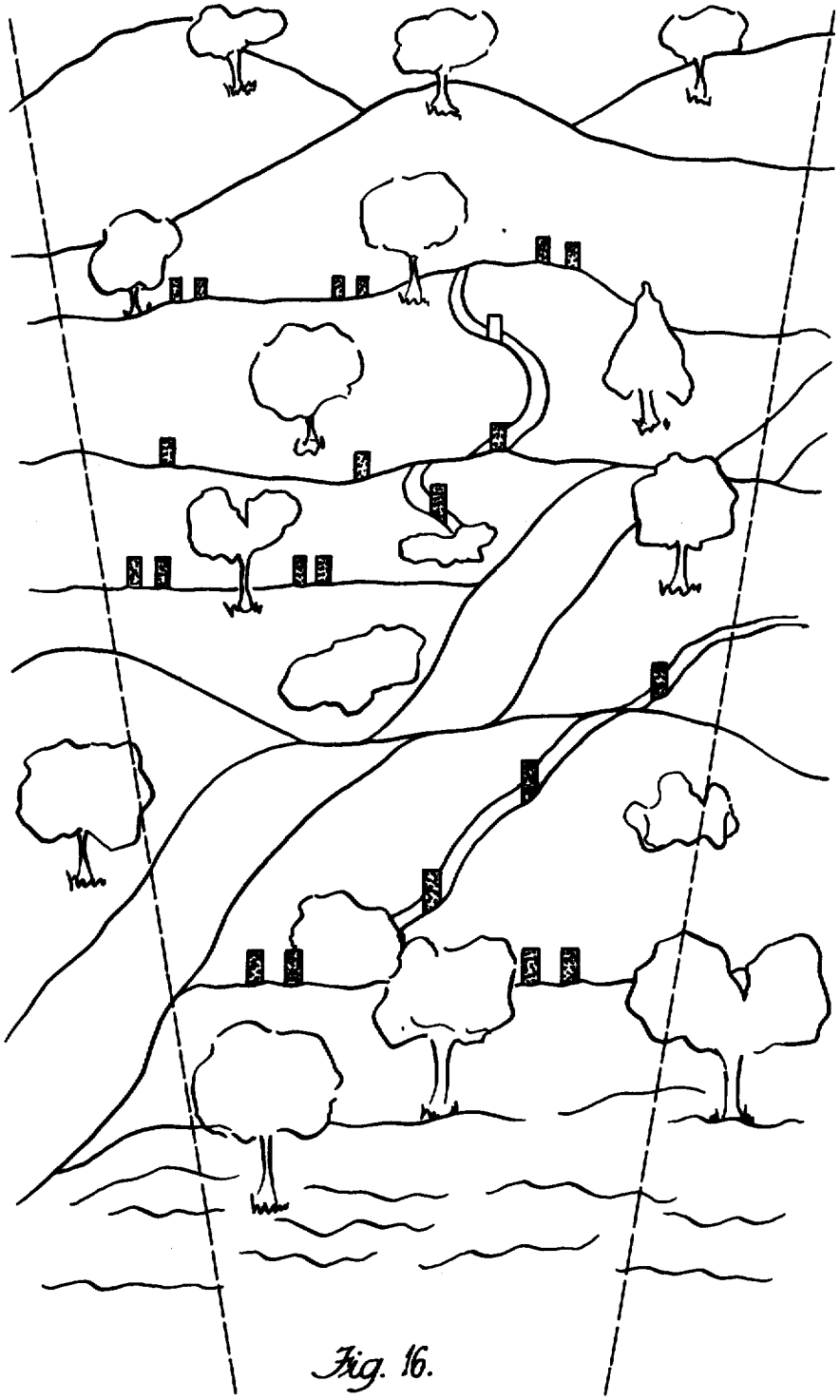

FIG. 6 similar to that shown in FIG. 5 but at different instant of operation;

FIG. 7 is a side view of the trolley shown above wherein it is entering a shelter shed at one end of a track;

FIG. 8 is a plan view of an electrical battery charging contact mechanism on a trolley near one end of the track;

FIG. 9 is a plan view similar to that as shown in FIG. 8 at the one end of the track;

FIG. 10 is a plan view similar to that as shown in FIG. 8 at the other end of the track;

FIG. 11 is an end view of the electrical battery charging contact mechanism at one end of the track;

FIG. 12 is a block schematic diagram of the electronic part of the apparatus;

FIGS. 13 to 15 show schematic views of target ranges in accordance with the invention;

FIG. 16 shows a general perspective view of a further target range as used to simulate jungle warfare in a battlefield.

DESCRIPTION OF PREFERRED EMBODIMENT

Figure 1:
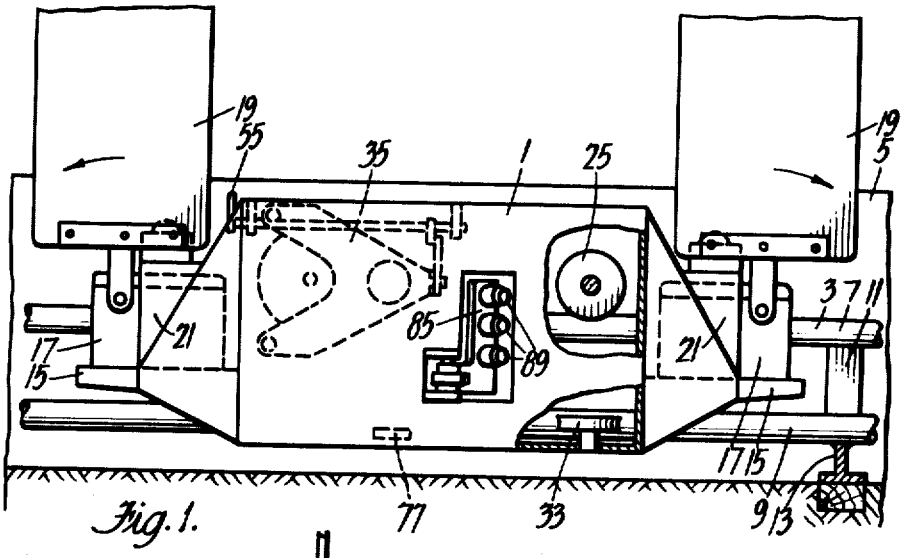
FIG. 1 is a side view of a trolley on a rail.
Figure 2:
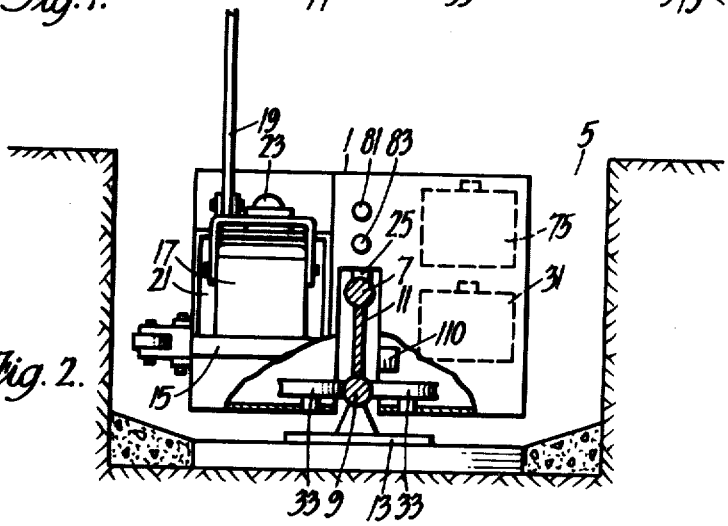
FIG. 2 is an end view of the trolley shown in FIG. 1.
Figure 3:
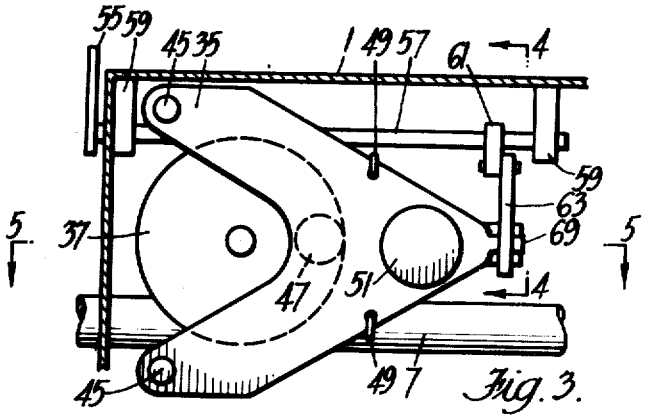
FIG. 3 is a close up side view of a brake mechanism of the trolley.

Referring generally to FIGS. 1 and 2 there is shown a trolley 1 on mono rails 3 in a track which is defined by a trench 5. The rails 3 are fabricated from tubular material and have an upper rail 7 and a lower rail 9 interconnected by spacing webs 11. The spacing webs 11 are equally spaced along the length of the rail for a purpose which will be explained later. The mono rail 3 has a vertical side height greater than its width—the diameter of the tubular material. As shown the depth of the trench 5 is sufficient so that the top of the trolley 1 is below ground level in which the trench 5 is provided and that the width of the trench 5 is only sufficiently wide to allow the trolley 1 to move freely therealong. The rail 3 is supported in the trench 5 on foundation means 13.

The trolley 1 is fabricated from metal sheet and has two platforms 15 at each end of the trolley and on one side of a central axis of the trolley. The platforms 15 support target mechanisms 17 which are target mechanisms of the type described in Australian Pat. No. 276,215. The target mechanisms 17 in turn carry targets 19 and move the targets 19 from an operative to inoperative position by radio control means. The plane of the targets 19 is in line with direction of intended movement of the trolley 1—see FIG. 2 where the targets are in the operative position—and the targets 19 are caused to swing in their plane in the direction of intended movement of the trolley 1—see FIG. 7 where the targets 19 are in the inoperative position.

The target mechanisms 17 are held in compartments 21 by means not shown. Night shoot devices 23 of the type also disclosed in Australian Pat. No. 276,215 are fitted on the top of compartments 21 and provided for night shooting.

Figure 4:
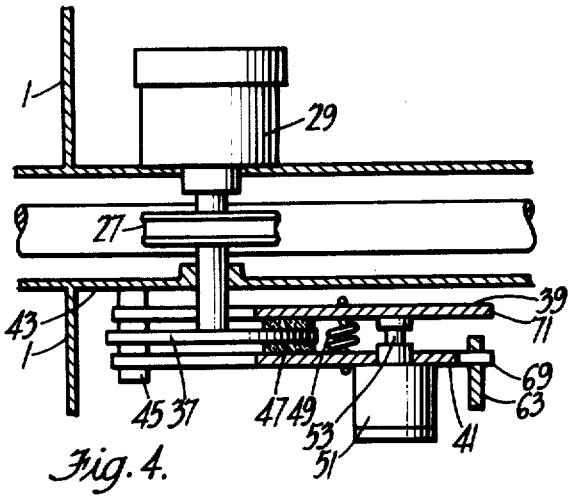
FIG. 4 is a cross sectional view taken along line 4—4 of FIG. 3.

The trolley 1 is suspended on the track 3 by a pair of driven wheels 25 and 27 which each engage the upper rail 7—see FIGS. 1 and 4—and are driven by two two-speed electric motors 29 which are, in turn, powered by a first battery source 31 shown dotted—see FIG. 2.

The trolley is stabilized against lateral movement across the track by two pair of jockey wheels 33 which engage the sides of the lower rail 9 at each end of the trolley 1.

The trolley has a disc brake mechanism 35—shown dotted in FIG. 1—shown in detail in FIGS. 3, 4, 5 and 6. The brake mechanism 35 has a disc 37 integral with the drive shaft of motor 29. On each side of disc 37 there is a boomerang shaped plate 39 and 41 respectively. Both plates 39 and 41 are supported at their free ends to an inner part 43 of the trolley by means of holding means 45. Disc brake pads 47 are fitted on each of the plates 39 and 41 at positions to clamp the disc 37 therebetween as a result of braking spring pressure applied to each of the plates 39 and 41 by a pair of springs 49.

The brake is released by operation of electric solenoid 51, the plunger 53 of which pushes the two plates 39 and 41 apart when voltage is applied to the solenoid 51. Manual release of the brake mechanism is sometimes required when the trolley is stationary on the track and this is effected by operation of a manual release lever 55. Lever 55 when operated by angular rotation causes a shaft 57 attached thereto and mounted in journals 59 to rotate to, in turn, cause a lever 61 integral with shaft 57 to swing to, in turn, cause an operating member 63 pivoted thereto to move downwardly.

The operating member 63 has a ramp surface defined by an inclined slot 65 and a cam surface 67. A pin member 69 on plate 41 is located in the slot 65. Downward movement of operating member 63 causes the operating member 63 to move sideways so that the cam surface 67 engages a surface of a projection 71 of plate 39 and applies pressure between pin 69 and that surface to cause plates 39 and 41 to move apart thus releasing the brake mechanism from braking spring 73 which ensures that the operating member 63 returns to the position shown in FIG. 5 when the lever 55 is released.

The trolley has a manual control panel (not shown—on one side thereof) for controlling various operation functions of the trolley and target mechanisms 17. The electronic circuitry for controlling the trolley and the mechanism has not been shown but is carried respectively in the trolley and in the target mechanisms 17 and are each powered by a second battery source 75.

The trolley also has direction reversing switch means therein which induces magnetically operable reed switch 77.

The reed switch 77 is made operable by a length of magnetic material 79 placed at suitable positions along the length of the track. Such positions are preferably at each end of the track—See FIG. 7—but may be at any desired location. When the reed switch 77 operates connection is made to the motors 29 to reverse the direction of rotation and hence the direction of movement of the trolley 1.

The trolley also has proximity sensing means at each end thereof which reverse the direction of drive of each of the motors and the direction of movement of the trolley. The proximity sensing means includes an infra red transmitter 81 and receiver 83—see FIG. 2—which is constructed and arranged so that when the receiver 83 receives an infra red light signal from either another transmitter 81 or another trolley or from a reflection of the infra red light transmitted by the transmitter 81 on the trolley and reflected back from a reflector.

The transmitter 81 consists of a light emitting diode which is triggered by an output from a pulse generator which transmits pulses of 10 $\mu$s duration at a repetition frequency of 1,200.

The receiver 83 comprises a photo-transistor, sensitive to emissions in the infra red wave band which is coupled to a differential amplifier.

The level of the amplifier is adjustable, thus effectively varying the sensitivity of the receiver 83. This provides a means of controlling the sensing distance between trolleys. The output of the receiver 83 is a.c. coupled to a switching stage which is controlled by feedback from the programmed directions of the motors.

The proximity sensing means is provided for a purpose which will be explained later.

The trolley carries electrical contact means 85, (FIG. 7), shown in detail in FIGS. 8, 9 and 10, which swing from an inoperative contact position to an operative contact position where they engage bus bars 87 at one end or both ends of the track and provide contact means whereby electrical energy can be applied to each of the first and second battery sources to recharge those sources.

The electrical contact means 85 has three electrical contacts 89 mounted at an end of swingable arm 91 which is pivoted about pivot 93.

The arm 91 is caused to swing so that the contacts 89 engage the bus bars 87 by means of an operating arm 95 with a jockey wheel 97 engaging an abutment rail 99 adjacent the bus bars 87. When the operating arm 95 swings, in either direction consequent on which direction the trolley 1 approaches the bus bars 87, it swings about a fixed pivot 101 and moves a link 103 pivoted thereto which, in turn, moves a lever 105 which is pivoted about a fixed pivot 107 to cause a wheel 109 to engage with the arm 91 to cause it to swing and the contacts to engage bus bars 87.

The central bus bar is common for both battery sources whilst the upper and lower bus bars carry voltage respectively for the first battery source and the second battery source and each has its own control circuitry for controlling the charging of each battery source and for inhibiting overcharging.

In a modification, not shown, the operating arm 95 is movable downwardly against spring bias when desired so that it does not engage with the abutment rail 99 and thus the contacts 89 do not contact the bus bars 87. This is particularly provided for when the trolleys are manually pushed to a shelter shed at the end of the track and should the trolleys should pass past the abutment rail 99 at one end of the track.

The trolley 1 has position sensing means for enabling the position of the trolley along the track to be determined. The position sensing means is indicated generally by 110—see FIG. 2—and comprises a reed switch which is operable to provide an electrical signal consequent on the trolley passing a track spacing member 11. Thus as the track spacing members 11 are spaced at known equal intervals along the rail 3 it is possible by counting the electrical signals provided by the reed switch to determine where the trolley is along the track. When the direction of movement of the trolley reverses, a logic system of the electronic circuitry is altered so that each signal then provided is subtracted so that no matter which direction the trolley moves along the track its position can be determined.

Photoelectric position sensing means may be provided as an alternative to the reed switch means. If desired such photoelectric position sensing means may be responsive to a photoelectric beam therein which is cut by spokes in the drive wheels 25 or 27.

By inspecting FIG. 1 it will be realized that the track can be manually picked up out of the trench and set up in another trench. Hence by using the above trolleys with the mono rails it is relatively easy to change the track layout of a range, as for example from one time of shooting to the next, to thus provide a variety of simulated battlefields on the one range from one time of shooting to the other. This is particularly so as the manual effort for digging new trenches in which the trolleys move, or cutting grass or like undergrowth where the track is to be much less than in known ranges where the targets on the trolleys swing across the direction of intended movement of the trolleys.

The ranges as shown in FIGS. 13 to 16 will now be described before the block schematic diagram as shown in FIG. 12 is referred to so that an appreciation of the practical manoeuvres the trolley can simulate can be realized. This should make the understanding of the block schematic diagram more simple.

In FIG. 13 the range shown has a track 121 along which several trolleys 1 are arranged to move. The track is defined by a trench and has a mono rail 123 therein on which the trolleys as previously described are placed.

The range has a number of lanes 124 and has two firing positions shown by circles at 125 and 127 respectively.

Behind the track 121 is a mound 129 into which bullets fired on the range theoretically settle.

In use the trolleys are set moving in the track with the targets being in either the operative or inoperative shooting positions. People shooting should only shoot at targets appearing in their respective lanes and because the targets are made to scatter by moving backwards and forwards along the track by reason of the proximity sensing means or the direction reversing reed switch 77 or by radio control means the targets represent dodging and/or appearing and disappearing targets.

A controller of the range has a transceiver which is constructed and arranged to provide instructions to the trolleys to move them one way or the other along the track or to move the target or targets carried thereby from the inoperative position to the operative position and vice versa. The transceiver also has controlling means to provide instructions to the targets to remain in the operative shooting position when hit or to move when hit to the inoperative position. Additionally the transceiver is provided with a radio hit count facility for each target.

A shelter shed 128 for the trolleys is provided at one end (or both ends) of the track 123 for the trolleys, after shooting, and the batteries in the trolleys are recharged as previously described when in the shelter sheds.

The range shown in FIG. 14 is similar to that as in FIG. 13, the control functions of a transceiver operated, by a controller of the range being identical. Here the difference is in that instead of their being only one track along which the trolleys move there are several placed in close proximity to each other the minimum distance between each being determined only by the width dimensions of the trolley.

The range shown in FIG. 15 has a plurality of two sets of tracks 123 extending generally towards a shooter—generally in the direction of intended shooting—and wherein the tracks each carry a target which faces the shooter and which moves a target to the operative shooting position and the inoperative shooting position by swinging the target either forwardly or rearwardly of the direction of intended movement of the trolley. The control console is the transceiver as described in the previous ranges. On a control signal being given the trolleys move and simulate a dodging target advancing or retreating. Preferably protective mounds 124 are placed in front of each of the sets of tracks to protect the trolleys from bullets when the trolleys are in a position moving directly in line with direction of shooting.

FIG. 16 shows how a simulated military battlefield can be prepared. The trolleys each are controlled by the transceiver or transmitter as previously described and by the operator or controller of the range. Obviously the tracks along which the trolleys move will be substantially non-visible as discussed before, but for the purposes of this patent specification the tracks are shown.

Referring now to the block schematic diagram of FIG. 12 each component is clearly marked and the concept of operation should be readily understood from that diagram, however, a brief explanation will follow:

The transceiver is the transceiver as used by the controller of the range and has multi-channel facilities for controlling each of the various functions and displays.

The receiver and transmitter are mounted in the trolley. The receiver is powered by one of the battery sources and the motors are supplied by the other battery source.

On signals being received either from a manual control or from the transceiver or from a transmitter (not shown) to start the trolley moving the brake solenoid is energised releasing the trolley brake and the motor drives the trolley. The end of track sensors, reed switch 77, or the proximity sensors have control over the motor to reverse direction of drive.

When the target is hit, hit signals are sent via the transmitter to the transceiver for indicating the number of target hits. The position sensor is also connected with the transmitter to provide signals to the transceiver to give an indication of the position of the trolley on the track.

In a modification of the trolley described above it may be driven by electric motors powered by a trailing cable. Alternatively the motors may be petrol motors with extra quiet silencers so that the noise of the motors will not be able to be detected by shooters thus giving a general indication of where the trolley and the targets thereon may appear.

In a modification of the ranges described above the transceiver may be controlled from a tape or similar recording media on which programs for each of the trolleys and targets have been recorded.

What is claimed is:

1. A self propelling trolley for use in shooting ranges [wherein the], *means carried by said trolley for moving said* trolley [is constructed and arranged to be movable] backwards and forwards along a track, [means carried by said trolley for propelling the same along said track,] a target moving mechanism mounted on said trolley, a target mounted for movement on said target moving mechanism, *said mounting being such that said target swings in the plane of movement of said trolley,* means for actuating said target moving mechanism for moving said target from an operative shooting position wherein said target is exposed *to a shooter* to an inoperative shooting position wherein said target is [not exposed] *completely unexposed to the shooter regardless of whether the trolley and target are approaching or moving away from the shooter, or moving in a direction generally perpendicular or at an angle to the shooter,* said target being constructed and arranged on said target moving mechanism so that the width of the trolley and target across the direction of intended movement of the trolley when the target is in the inoperative shooting position is not substantially greater than the width of the trolley and target across the direction of intended movement of the trolley when the target is in the operative shooting position, and wherein the position of mounting the target on the trolley is such that when the target is in its inoperative position the height of the trolley and target is substantially the same as *or less than* the height of only the trolley, and wherein in the operative position the height of the trolley and target is greater than the height of only the trolley, *said trolley moving means and said target actuating means being controlled by radio control means operated by an operator of the range to move said trolley backward or forward along said track without regard to the target being hit, and to selectively signal said target moving mechanism to control movement of said target when hit so that said target either remains in the operative shooting position or is moved to an inoperative position completely out of sight of the shooter, and wherein the track on which the trolley is to be used has a monorailway track therein which has a height greater than its width and wherein the trolley is such that, in use, it is substantially centrally located over the track with the top of the railway track being closer to the top of the trolley than to the bottom and wherein the trolley is provided with motor means and supporting wheels adapted to engage the upper surface of the railway track to suspend the trolley on the railway track: one of the supporting wheels being operatively connected with the motor means for propelling the trolley.*

[2. The trolley of claim 1 wherein the target moving mechanism is such as, in use, to move the target from the operative to inoperative shooting positions with the plane of the target swinging in a generally vertical plane extending in the direction of intended movement of the trolley.]

3. The trolley of claim 1 wherein the target moving mechanism is such that, in use, the plane of the target extends transverse to the direction of intended movement of the trolley in both the operative and inoperative shooting positions.

4. The trolley of claim 1 wherein a target moving mechanism is mounted at each end of the trolley each for moving such a target as aforesaid.

[5. The trolley of claim 1 wherein the track on which the trolley is to be used has a monorailway track therein which has a height greater than its width and wherein the trolley is such that, in use, it is substantially centrally located over the track with the top of the railway track being closer to the top of the trolley than to the bottom and wherein the trolley is provided with motor means and supporting wheels adapted to engage the upper surface of the railway track to suspend the trolley on the railway track: one of the supporting wheels being operatively connected with the motor means for propelling the trolley.]

6. The trolley of claim 5 wherein the trolley is provided with at least two stabilizing jockey wheels which engage, in use, opposite sides of a lower part of the railway track.

7. The trolley of claim 5 wherein the trolley is provided with a braking mechanism for braking movement of the trolley.

8. The trolley of claim 7 wherein said braking mechanism is a disc brake mechanism integral with one of the supporting wheels, a brake release mechanism, and spring biasing means for braking said disc brake mechanism when said brake release mechanism is inoperative.

9. The trolley of claim 7 wherein the brake release mechanism includes an electrical solenoid brake release mechanism and a manual brake release mechanism.

10. The trolley of claim 5 wherein another of the supporting wheels is operatively connected with another motor means and both motor means include electric motors.

11. The trolley of claim 10 wherein both motor means are constructed and arranged to operate at different speeds for propelling the trolley at different speeds as selected.

12. The trolley of claim 10 wherein electric power for said motor means is obtained from rechargeable battery means carried by the trolley.

13. The trolley of claim 12 further including electrical contact means on the trolley which is engageable, in use, with bus bar means adjacent the track thereof for supplying current for recharging the battery means.

14. The trolley of claim 13 wherein the electrical contact means is mounted on the trolley to swing about a pivot and is operatively connected with an operating member so that, in use, when the operating member engages an obstruction member adjacent the bus bar means the electrical contact means are caused to swing as aforesaid to contact the bus bar means.

15. The trolley of claim 14 wherein said operating member is movable against spring bias so as to not engage the obstruction member when so moved and to thereby prevent the electrical contact means for contacting the bus bar means.

16. The trolley of claim 13 wherein there are three electrical contacts included in the contact means and there are three bus bars included in the bus bar means, one of the bus bars being common and the other two, in use, being at a battery charging potential constructed and arranged to independently charge each of the battery means.

17. The trolley of claim 1 wherein there is provided reversing means on the trolley operable to reverse direction of movement of the trolley when the trolley is at an end of the track.

18. The trolley of claim 17 wherein the reversing means includes a magnetically operable switch which is made operative by magnetic circuit means at the end of the track which when operated, in use, causes reversal of direction of movement of the trolley.

19. The trolley of claim 1 further including proximity sensing means on the trolley for sensing the proximity of another trolley on the track and for causing the trolley to, in use, reverse direction when said another trolley is within a predetermined range.

20. The trolley of claim 19 wherein the proximity sensing means comprises a light receiving transducer constructed and arranged such that when light is received thereby which is projected from a light transmitter and, in use, the transducer output consequent thereon is above a predetermined value the trolley is caused to reverse its direction of travel.

21. The trolley of claim 20 wherein the light receiving transducer is responsive only to pulsed light transmitted from the light transmitter, thereby inhibiting operation by continuous light falling on the light receiving transducer.

22. The trolley of claim 1 further including trolley position sensing means constructed and arranged to provide an indication of the position of the trolley along the track.

23. The trolley of claim 22 wherein said trolley position sensing means includes a sensor constructed and arranged to, in use, provide an electrical signal, and a transmitter constructed and arranged, in use, to transmit an electrical signal to a remote receiver capable of providing information as to the position of said trolley along the track.

24. The trolley of claim 23 wherein the position sensing means, in use, provides an electrical signal pulse as the trolley moves over a given length of track and the position of the trolley is determined by arranging the electrical signal pulses so generated to provide a display representative of each given length of track.

25. The trolley of claim 24 wherein said electrical signal pulses are generated at the trolley by photoelectric means.

26. The trolley of claim 24 wherein said electrical signal pulses are generated by magnetically operable reed switches.

27. The trolley of claim 22 wherein said track has an upper rail part and a lower rail part connected by equally spaced apart spacing webs and wherein the position sensing means is, in use, responsive to count the spacing webs passed by the trolley thus giving an indication of the position of the trolley on the track.

28. The combination of claim 1 wherein said track is of a width only sufficiently wide to allow the trolley to pass and is of a depth which when the trolley is in the track the top of the trolley will be below the depth of the track, the path of the track further being such that, in use, the trolley and the target, when in the inoperative position, are out of sight of a shooter at a firing position and wherein the path over substantially its whole extent is also out of sight of the shooter at the firing position.

29. The combination of claim 28 wherein movement of the trolley is radio controlled by a transceiver which in use is operated by an operator of the range.

30. The combination of claim 29 further including night shooting means on the trolley operable by said transceiver.

31. The combination of claim 28 wherein there is a shelter shed at a position along the track in which the trolley can be stored.

32. A self propelled device for use in shooting ranges wherein said device is constructed and arranged to be movable backwards and forwards along a track, means carried by said device for propelling the same along said track, a target moving mechanism mounted on said device, a target mounted on said target moving mechanism, means for actuating said target mounting mechanism for moving said target from an operative shooting position wherein said target is exposed to an inoperative shooting position wherein said target is not exposed, said target being constructed and arranged on said target moving mechanism so that the width of the device and target across the direction of intended movement of the device when the target is in the inoperative shooting position is not substantially greater than the width of the device and target across the direction of intended movement of the device when the target is in the operative shooting position, and proximity sensing means on said device for sensing the proximity of another device on the track and for causing said device to reverse direction when another device is within a predetermined range.

* * * * *